Oct. 23, 1934.  W. T. HOWALD ET AL  1,978,108
GRID WINDING MACHINE
Filed May 22, 1930   6 Sheets-Sheet 2

Inventors
WERNER T. HOWALD
SAMUEL T. BOUBLIS
FREDERICK HARPER
By Their Attorney
John J. Lynch Oct. 23, 1934.  W. T. HOWALD ET AL  1,978,108
GRID WINDING MACHINE
Filed May 22, 1930   6 Sheets-Sheet 4

Inventors
WERNER T. HOWALD
SAMUEL T. BOUBLIS
FREDERICK HARPER
By Their Attorney
John J. Lynch Patented Oct. 23, 1934

1,978,108

UNITED STATES PATENT OFFICE 1,978,108

GRID WINDING MACHINE

Werner T. Howald, Brooklyn, N. Y., and Samuel T. Boublis, Springfield, and Frederick Harper, Irvington, N. J.

Application May 22, 1930, Serial No. 454,736

15 Claims. (Cl. 140—71)

This invention relates to radio tube interior parts manufacture and in particular to a machine for producing the grids employed in tubes of the character referred to.

In the manufacture of radio grids heretofore, it has been the practice to wind about a relatively heavy wire form, a continuous long grid and then cut the grid in short pieces to fit within the tubes. This resulted in considerable waste of the expensive wire used in the winding of the grids. It also necessitated manual handling and the wires of the grid became disarranged and their efficiency accordingly impaired.

In producing grids heretofore, it has also been the practice to weld the grid wire to the sustaining wires at the points where they meet and this is an expensive operation, a slow one, and not applicable to all kinds of wire.

It is a particular object of our invention, therefore, to overcome the foregoing objections and in addition, to produce a machine which will automatically wind the grids and between each successive grid, will skip, that is, will not wind that portion of the support wires which will subsequently be used in securing the grid in position within the tube with the result that a saving of wire will be effected which will be substantial.

Further, our machine will slot the wire forming the grid and about which the finer wire is wound so that the wire is held in the slot and thereafter imprisoned by swedging so that the grid is strong, will withstand shipping jars and comparative rough handling and on account of its method of manufacture will have an increased life in the tube.

A still further object of our invention is to provide a machine for the automatic winding of radio tube grids which permits winding of a number of different cross sectional shapes of grids without materially altering the parts of the machine. Adjustments are provided in the machine whereby any number of turns of wire per inch may be made on the grids and complete adjustment of the various parts of the machine is afforded so that grids may be manufactured to meet various operating conditions.

With these and other objects and advantages in view, our invention comprises the construction and operating parts forming the improved grid winding machine herein shown and hereinafter to be described as a preferred embodiment of our invention.

Referring to the drawings in detail, 5 indicates a base which is secured in any suitable manner to a suitable leg frame 6 constituting a support for the base and supporting the operating motor 7 which is secured thereto in any suitable manner.

Figures 1, 2:
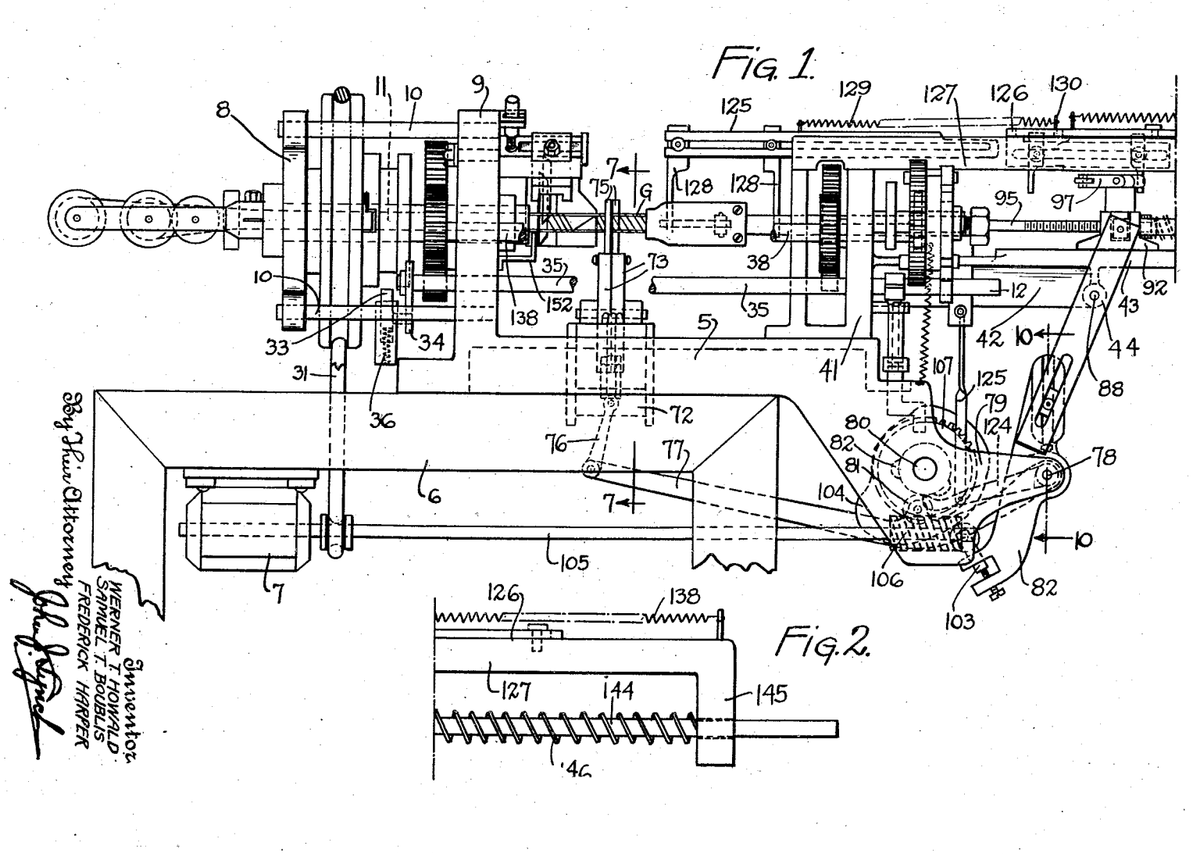
Figure 1 is a view in side elevation of a grid winding machine constructed in accordance with our invention.
Figure 2 illustrates the broken off part of the machine constituting an extension on the right hand end of Figure 1.

The feeding and operating mechanism located at the left hand end of the machine as illustrated in Figure 1, comprises the plate 8 which is held in spaced relation with the vertical wall 9 of the base through the medium of the post 10, the plate 8 providing a journal in which revolves the feed tube assembly 11, the latter being also journalled in the vertical wall 9 of the base and being arranged to carry at its end beyond the plate 8, a spool carrying frame or yoke 12 in the arms of which are journalled for rotation, the spools of wire 13 and a wire guide and tensioning device 14 which is arranged to take up the slack of the wire as it is fed through the feed tube assembly to the point where it is to be wound with the relatively finer wire, which will be hereinafter described.

These spools 13 carry the wires which are used to form the body or support of the grids. The feed tube assembly consists essentially of an inner, hollow tube 15, the diametrically opposite peripheral surface of which is provided with semicircular grooves or seats through which passes the support wire 16, the grooves being indicated by the numeral 17.

While the feed tube assembly may be altered in construction, its essential parts consist of the inner tube 15, an intermediate tube 18 and an outer tube 19, the intermediate tube 18 being grooved on its inner periphery to match the grooving of the inner tube 15 so that two tubular passages are provided at diametrically opposite sides of the inner tube 15 through which pass the support wire 16.

The outer tubular shaft 19 abuts at one end the sleeve 20 to which is suitably clamped the wire spool holding yoke 12. The sleeve 20 is jammed between the end of the tubular shaft 19 and a nut 21 which is also in the nature of a slotted sleeve and fits over the inner tube 15 and is arranged to abut the end of the intermediate tubular shaft 18. The opposite end of the inner hollow tube 15 carries a bevelled washer 22 on the bevelled surface of which is placed a die holding chuck 23 which is provided with a bore 24 and a die holding slot 25 so that either a cylindrical die may be employed, depending upon the type of grid to be wound, or a flat, rectangular die may be secured in place in the die holding chuck.

In the present instance, a flat substantially rectangular die 26 is employed, the opposite edges of which are provided with semi-circular grooves which are disposed in alignment with the grooves formed in the inner hollow tube 15. The die 26 fitting, as it does, within the die chuck 23 is held securely in place therein by reason of the fact that the chuck is arranged to receive a locking nut 27 which, in being threaded over the chuck, jams it against the bevelled washer 22 and causes the slot of the chuck to close to grip the die held therein. This nut 27 forms a double function in that it compresses the chuck to hold the die and it also connects the chuck to the end of the outer tubular shaft 19 so that a unitary structure is formed which, through the medium of the pulley 28, the clutch sleeve 29 and drive gear 30, is revolved when the clutch sleeve 29 is in operative connection with the clutch face of the pulley 28. The pulley 28 is driven from the motor 7 by the belt 31. The clutch sleeve 29 through the medium of a suitable spring is maintained in driving relation with the pulley 28 and is provided with a suitable camming slot 32 into which is arranged to be projected a pin 33 by the pin lever 34, (see Figure 3). The pin lever is secured to the end of the shaft 35 which may be referred to as the clutch shaft. The pin 33 is normally urged toward the clutch slot 32 by the spring 36. The driving gear 30 which is suitably keyed to the tubular shaft 19 meshes with the gear 37 and through it, drives the shaft 38. Both the shafts 35 and 38 are journalled in the spaced walls 39 and 40 provided on the bracket 41 which, in any suitable manner, is secured to the base 5 and has cast integral therewith the overhanging table 42 which forms a bed 43 for a sliding nut to be hereinafter described and a pivot pin holding portion 44, to be hereinafter referred to.

Intermediate the walls 39 and 40 on the brackets 41, the shaft 38 carries a gear 42 which meshes with and drives a gear 43 which is suitably splined to the gripper shaft 44 in such a manner that the shaft 44 will be revolved by the gear 43 and at the same time be permitted to move longitudinally through the gear. The forward end of the gripper shaft 44 is arranged to carry a gripper housing 45 in which is pivoted the gripper jaws 46 shaped at their inner ends to constitute cam surfaces 47 against which, through the medium of a spring 48, is constantly urged, a roller 49. The tendency of this roller 49 is to close the gripping jaw ends 50 and is opposed by a spring 51 positioned between said jaw ends 50 and at predetermined times, the roller 49 is moved away from the cam surfaces 47 through the medium of an eccentric 52 which is mounted on an eccentric rod 53 passing through the gripper housing 45. The outer end of the eccentric rod 53 is turned upwardly as at 54 and carries in its end a roller 55 which is arranged to be engaged alternately by suitable members so that the jaw ends 50 of the gripper are permitted to open and close to take hold of the end of a grid being formed.

Figures 11, 12, 16, 20, 21:
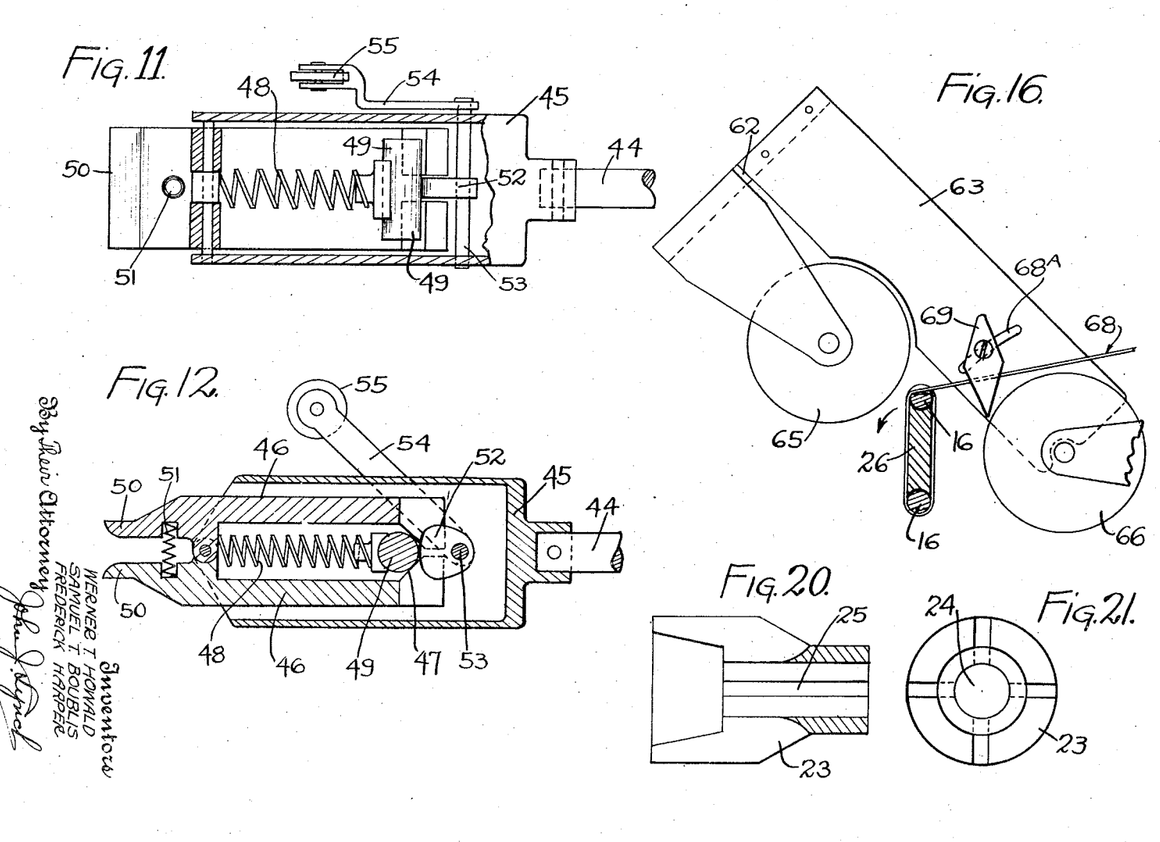
Figure 11 is a sectional plan view of the gripper used in the machine.
Figure 12 is a view in sectional elevation of the gripper illustrated in Figure 11.
Figure 16 is a diagrammatic view showing the relative positions of the cutting and swedging disks together with the means for feeding the wire to the grid form.
Figure 20 is a view in longitudinal section of the die holding chuck employed in the machine.
Figure 21 is an end view of said chuck.

The vertical wall 9 of the base 5 also provides a journal for the shafts 35 and 38 and is arranged to support the cutting and swedging disk holders both of which are substantially alike in construction and it is believed that a description of one will suffice. The wall 9 is slotted to receive the extension 56 which, through the bolt 57 forming a part thereof, is adjustable in the slot to position the brackets 58 against the face of the wall 9. The bracket 58 is substantially U-shaped and receives between its forks, filler pieces 59 within which is held the shank 60 of the disk carrier 61 in whose formed ends, the disk shaft is journalled. The disk may be either the cutter disk or the swedging disk. The cutter carrier 61 may be revolved or may be moved toward and away from the wall 9 to bring the cutter or swedging disks to the proper position and through the adjustment of the entire holder, the disks may be brought toward or away from the work. The swedging disk holder is provided with a bracket 62 to which is secured one end of a guide plate 63 which is provided with a suitable cut-out to provide room for the swedging disk 65 and at its free end is arranged to fit closely to the cutting disk 66, the plate 63 engaging the edge of the disk at the point 67 so that a drag is provided for the grid wire 68 which is drawn from a suitable reel 69 mounted on the machine, as illustrated in Figure 16. The plate 63 is of thin steel and is slotted as at 68—A to receive a diamond shaped guide 69 which is adjustably positioned in the groove 68—A. The purpose of this guide 69 is to compensate for the rise and fall of the wire 68 during a revolving movement of the grid support wires 16 so that the grid wires 68 will always fall in the groove made by the cutter disk 66. It will be noted that the die 26 extends beyond the cutting and swedging disks so that it forms a support during the cutting and swedging operation and the winding of the wire 68 about the support wires 16 within the grooves formed by the cutting disks, is not only facilitated but is wound tightly and is properly shaped about the die and can thereafter be drawn off the die by the advance movement of the wires 16 which form the support of the grid.

The cutting and swedging disks operate freely and as illustrated in Figure 16, the grid wires 16 revolve in a counter-clockwise direction so that they are successively brought into contact with the edge of the cutting disk 66 which grooves them and into this groove, so formed, the wire 68 drops or is placed by the revolving movement of the wire 16 and in its continued movement, the groove that has been made by the cutter disk is closed by the swedging disk, whose face is flat enough to crowd the metal at each side of the notch made by the cutter disk over the wire 68 that has been laid in said slot with the result that the wire is imprisoned and a rigid, unitary structure is provided.

Figure 8:
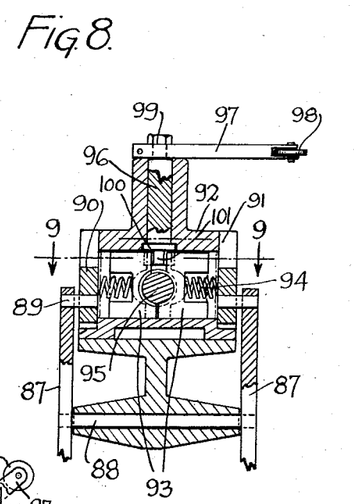
Figure 8 is an enlarged section taken on the line 8—8 of Figure 3 and shows the construction of the operating nut.
Figure 9:
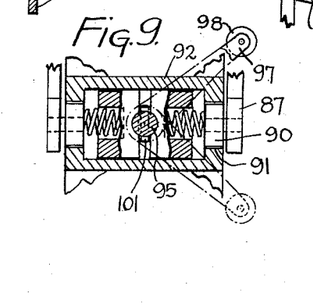
Figure 9 is a section taken on the line 9—9 of Figure 8 showing the method of operating the part of the nut.
Figure 10:
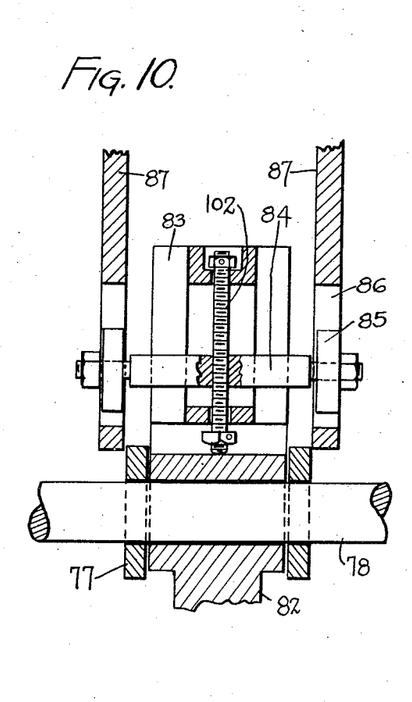
Figure 10 is an enlarged section taken on the line 10—10 of Figure 1 and illustrating the nut operating rock lever.

In order that the grid may be severed at the proper time, we provide on the base 5, a bracket 70 to which is secured the toggle slide frames 71 in which operates the slide 72 to impart a closing movement of the cutter arms 73 through the medium of the link 74 upon a downward movement of the slide 72. The upper ends of the cutter arms 73 carry the replaceable cutters 75 which cooperate in cleanly shearing off the end of a finished grid. The slide 72 is operated through the medium of a link 76 and cutter lever 77, the lever 77 is pivoted on the rod 78 connecting the extended portion 79 of the rear end of the base 5. The lever 77 passes under the cam shaft 80 which is journalled in the extension 79 of the base 5 and carries a roller 81 which is arranged to be operated by a suitable cam 82 carried on said cam shaft 80 so that at a predetermined time, a downward movement is imparted to the cutter slide 72 and the cutters are operated to sever the grids. The lever 77 is forked in that portion which engages the rod 78 so that it may pass around a rock lever 82 which is journalled on the rod 78 and which in its upper end is slotted as at 83 to permit adjustable movement therein of a pin or bolt 84 which carries adjacent its outer end, the blocks 85 which are disposed in suitable slots 86 formed in the rock levers 87, these rock levers being disposed at the opposite sides of the lever 82 and being pivoted intermediate their length as at 88 on a pin which passes through the end of the overhanging portion 42 of the bracket 41. The upper ends of the levers 87 which may be referred to as the nut operating levers are pivoted as at 89, see Figure 8, to the blocks 90 which are disposed in recesses 91 at the opposite sides of a slide 92. The slide is hollow and has mounted for sliding movement therein, the locking members 93 which are normally urged toward each other by the springs 94, the opposing faces of the members 93, which in combination, constitute a nut, are arranged to grip the threaded surface of the screw shaft 95 which screw shaft forms a continuation of the gripper shaft 44. The slide 92 is arranged to be reciprocated by the levers 87 and at predetermined times, it is desired that the slides grip and carry with it the screw shaft 95 and also its continuation, the gripper shaft 44 and the gripper and in order that this movement may be accomplished, the slide 92 is arranged to receive a bolt 96 to the upper end of which is secured an arm 97 on whose outer end is carried a wheel 98. The arm 97 is secured to the bolt 96 through the medium of the nut 99 and may be adjusted relatively thereto. The lower end of the bolt 96 is provided with a flange 100 from which depends a flattened portion 101. This flattened portion is disposed between the upper ends of the gripping members or nuts 93 and a revolving movement of the bolt 96 will cause a turning of the elongated flattened portion 101 with the result that the nut 93 will be separated and will disengage the threaded shaft 95 at which time the slide may operate freely relatively to said shaft 95 or until an obstruction engages the roller 98 to throw the bolt 96 to position to permit the nut 93 to engage the shaft 95. In order that the throw of the levers 87 may be varied, a screw 102 is imprisoned in any suitable manner in the slotted end of the lever 82 and passes through the bolt 84 and having threaded connection therewith, any adjustable movement may be imparted to the bolt 84 by revolving the screw 102 which will position the blocks 85 within the slots 86 of the arms 87 to increase or decrease the throw of the upper ends of the arms 87 beyond their pivot point 88.

Figure 5:
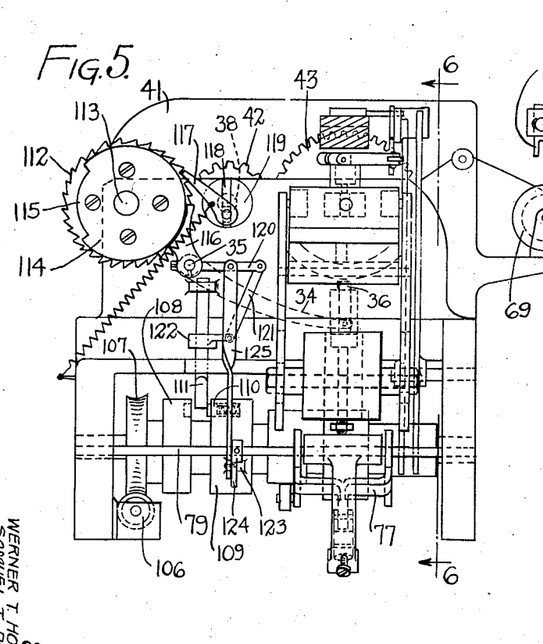
Figure 5 is a view in end elevation of the machine illustrated in Figure 1, the view being taken from the right hand end of the machine.

The lower end of the lever 82 is provided with an adjustable roller 103 which bears against a cam 104 carried on the cam shaft 80 through the medium of which, an oscillating movement is given the slide 92. In order that the cam shaft 80 may be revolved, a shaft 105 which may be an extension of the motor shaft or suitably operated thereby carries a worm 106 which operates a worm wheel 107 to which is secured one unit 108 of a clutch combination, the other unit being indicated as at 109 and being arranged to carry a spring pressed pin 110 which forms a driving connection between the parts 109 and 108 except when it is retracted by the operation of the vertical clutch rod 111, see Figure 5.

In order that the exact number of turns may be given the grid during its winding, a measuring means has been provided in the nature of a ratchet 112 which is mounted on the stub shaft 113 journalled in the bracket 41, this shaft carrying in spaced relation to the ratchet 112, a stop plate or disk 114 provided on its periphery with a stop seat 115 into which is arranged to drop a stop arm 116 which is secured to the shaft 35 and in position to be urged against the periphery of the disk 114. The ratchet 112 is arranged to be driven by the pawl 117 which is mounted for adjustable movement in a slot 118 provided in the base of an eccentric disk 119. The eccentric disk is mounted on the end of the shaft 38 which, as before noted is driven through gear 37 and gear 30.

The relation of the clutches 29 and 109 is a very important one and when one is operating, the other is non-operating. When the clutch 29 causes operation of the gears 30 and 37, the shaft 38 revolves as well as the gears 42, 43 and the gripper having hold of the grid during the winding operation, will revolve in unison therewith and the gripper shaft 44 and the feed tube shaft assembly will all operate in unison. They must maintain this same relation at all times in order that the gripper will be in position at a predetermined time to take hold of the grids and this unison of operation is carried out through the gears 30, 37, the shaft 38 and the gears 42 and 43 and when the clutch, as before mentioned, is operating to drive from the wheel 28 through gear 30, it will drive until the ratchet 112 has been revolved by the operation of the pawl 117 until the seat 115 of the disk 114 comes opposite the lever 116, which, through its connection with the shaft 35, will be moved into the seat 115, it being urged into the seat by the spring 36, before referred to and its seating will revolve the shaft 35 and throw the pin 33 up into the cam slots 32 which will immediately disconnect the drive of the pulley 28 from the gear 30 and will disengage the stop pin 111 from the clutch 109 and permit the pin 110 thereof to make driving engagement with the operating portion 108 of the clutch which will cause operation of the cam shaft 80 and all of the cams mounted thereon. The operation of the stop pin 111 is carried out through the medium of a lever 120 which, through the link 121 is connected with a collar 122 secured to the pin 111, the upper end of the pin passing through a suitable boss cast in the bracket 41. The clutch member 109 is provided with a cam spot 123 which is arranged to operate an arm 124 to which is secured the link 125, the upper end of which is secured to the lever 120. When the cam spot 123 operates the lever 124, it will draw down on the link 125 and revolve the shaft 35 clockwise to remove the stop lever 116 from its seat 115 in the disk 114. The revolving movement of the cam shaft 80 and its associated cams, will, through the various levers, carry out the operations of the machine to be hereinafter described. When the lever 116 has dropped into the seat 115, it will automatically raise the clutch pin 111 and permit operation of the clutch shaft 80 through the clutch until the cam spot 123 moves the lever 124 downwardly which, through the lever 125 and its associated parts, will move the clutch pin 111 downwardly to retract the pin 110 and thus discontinue operation of the clutch shaft 85. When this operation has been discontinued, the downward movement of the pin 33 by the lever 34 which is attached to the shaft 35 will permit operation of the clutch 29 and provide a drive between the pulley 28 and the gear 30 with the result that the same cycle of operation occurs until lever 116 again seats itself in the seat 115.

In order that the slide nut and the gripper may be operated through their operating arms 97 and 54 respectively, suitable slides 125 and 126 are employed which, in any suitable manner are secured to the top 127 of the bracket 41. The slide 125 carries the adjustable fingers 128 which operate back and forth at the proper time intervals to operate the gripper arm 54 so that the gripper is opened and closed at the proper moment. The slide 125 is provided with a slot in which the fingers 128 are adjustable so that they can be positioned any distance apart and also the slide is connected through the medium of a spring 129 with a fixed post 130 on the top 127. The slide 125 has secured thereto, an extension 131 to which is pivoted the operating lever 132 which is pivoted on a suitable stub shaft 133 held in one side of the base 5, the lower end 135 being arranged to bear against the cam 136 mounted on the cam shaft 80. Slide nut and in this respect a slide 137 is employed which is held in slidable position on top of the top strip 127 and through the medium of a spring 138 is normally urged to the rear, the end of the spring being secured to the fixed post 139.

Figures 3, 4:
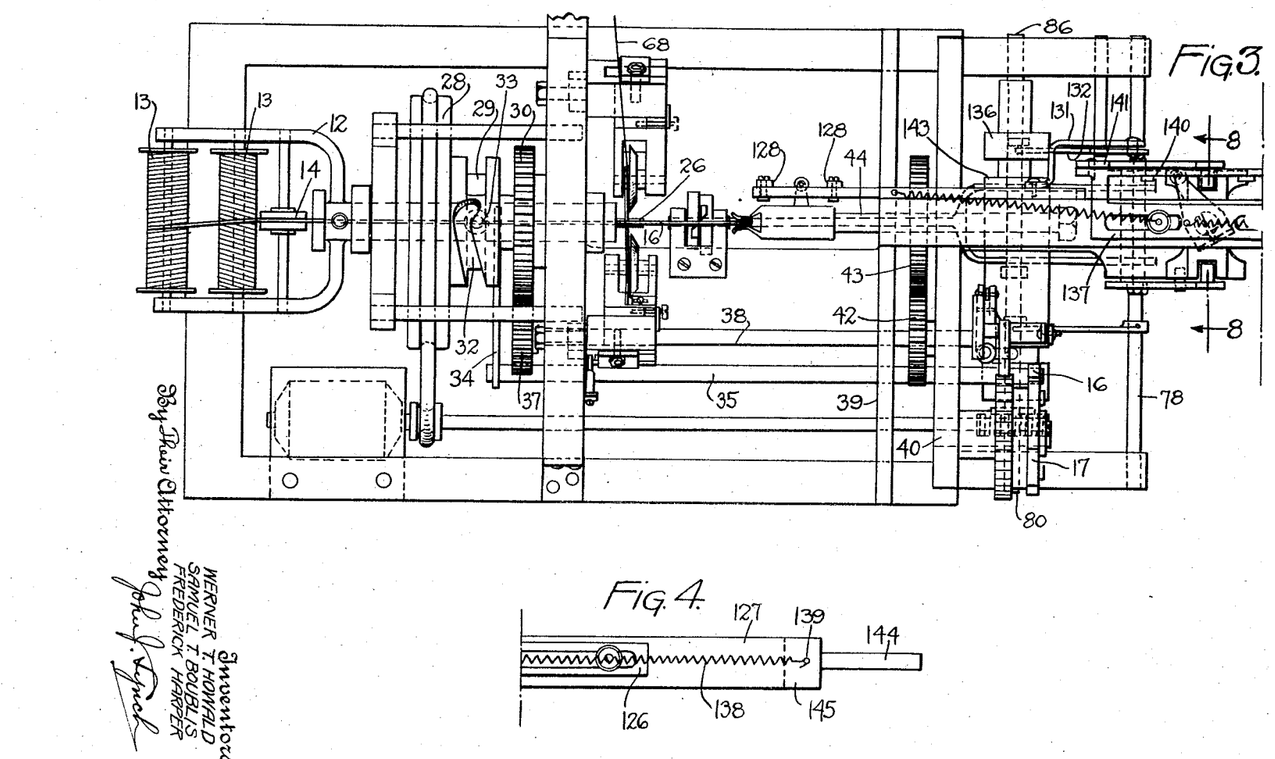
Figure 3 is a top plan view of the machine illustrated in Figure 1.
Figure 4 is a top plan view of the extension illustrated in Figure 2.
Figure 6:
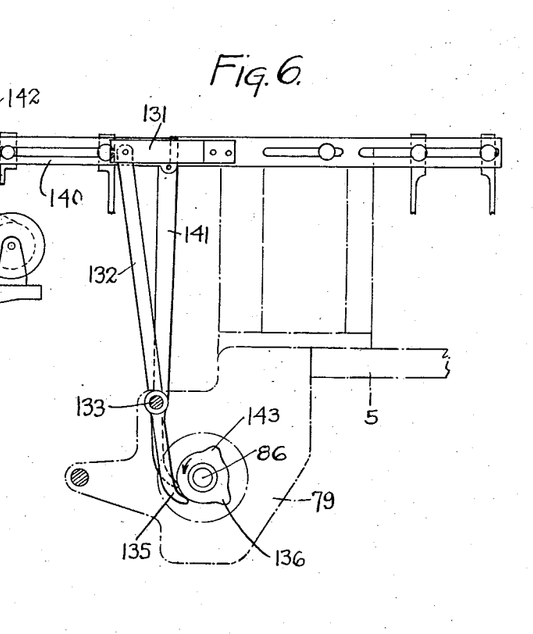
Figure 6 is a fragmentary section taken on the line 6—6 of Figure 5.
Figure 7:
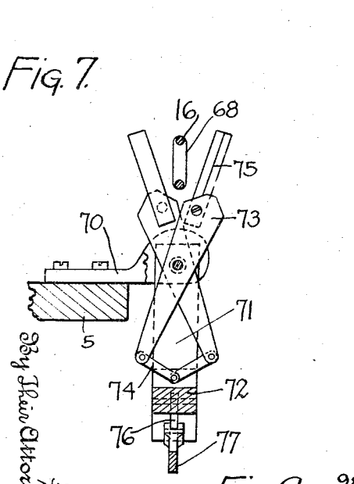
Figure 7 is an enlarged section taken on the line 7—7 of Figure 1, illustrating the cutters.

The slide 137 is provided with the overhanging portion 140 to which is secured the operating lever 141, see Figures 3 and 6. The slide 140 is slotted and carries in the slot, the adjustable stops 142, which are spaced apart the proper distance to engage the roller 98 of the arm 97 to operate the slide nut at the proper interval. The lever 141, like the lever 132 is pivoted on the stub shaft 133 and is arranged to engage a cam 143 also carried on the shaft 86. The slide 92 has secured thereto one end of a tubular shaft 144 which passes through a depending portion 145 of the top 127 and coil springs 146 is employed about the tubular member 144 which bears against the part 145 and against the slide 92 so that the roller 103 of lever 82 is maintained against the cam at all times.

In the operation of our machine, the cutting is always performed between two finished grids, that is, when one grid is cut and dropped off as a completted grid, there is another grid already finished in the machine but between the two grids, a skip has been provided which saves the expensive wire which heretofore has been wound continuously and greatly increases the cost of the grid manufacture.

For the purpose of illustrating the operation of the machine, assume that a completed grid has been cut, the slide 125 operates through its lever and cam and one of its depending fingers 128 operates the gripper to release the finished grid, which may be noted by the letter G. When the release occurs, the gripper is in its rearward position and the slide nut grips the threaded shaft 95. Operation of the lever 82 will then cause forward movement of the gripper, whose jaws being open will be positioned over one end of the next or finished grid and a subsequent movement of the slide 125 will cause one of its depending fingers 128 to release the gripper and permit its jaws to grasp the end of the grid. When this has occurred, the slide 140 operates through one of its depending members 142 to open the nut in the slide 92 with the result that the threaded rod 95, forming part of the gripper shaft is released and the rock levers 87 return the slide to its neutral position after which, subsequent operation of the slide 140 closes the nut in the slide 92 and causes it to grip the threaded shaft 95. All of the cams on the cam shaft 86 are provided with a neutral surface in a radius of approximately 20 degrees while the spot 123 of the cam 109 operates the lever 124 and with it, the link 125 to break the driving connection between the clutch parts 108 and 109 by moving the clutch pin 111 out of the groove. At the same time, the shaft 35 revolving in a clockwise direction, operates the lever 34 to retract the pin 33 and permit the clutch 29 to operatively unite the wheel 28 and the gear 30. At this time, the cam shaft 86 has stopped operating and the revolving movement imparted to the gear 30, gear 37 and shaft 38 is transmitted to the gears 42 and 43 to the gripper shaft 44 with the result that the threaded rod 95 threads through the slide nut and the gripper is retracted and at the same time the second grid is being fully wound, the winding operation continuing until the ratchet 112 has been so far operated that it brings the seat 115 of disk 114 into register with the lever 116 which seats in said seat 115 and by its seating movement revolves the shaft 35 counter-clockwise to move the pin 33 up into the clutch 29 to disconnect the drive from the wheel 28 to the gear 30, thus topping the winding operation instantly and simultaneously raising the clutch pin 111 to permit drive of the cam shaft from the worm wheel 107. The nut in the slide 92 being closed, is retracted by a suitable operation of the lever 82. This is the skip, that is, the winding of one grid has ceased and the winding of the next grid is about to commence but in order to provide extensions on the grids through the medium of which the grid itself may be positioned within a tube, it is necessary that the support wire 16 be left uncovered for a space between the ends of the windings of each of the grids and the skip is one of the features of our invention, in that the wire employed in the winding being of a very expensive nature, is not used during the skip in any appreciable amount but simply to tie one grid winding with another so that no break occurs in the winding wire with the result that a space is left between each of the grids at which point the grids are cut. When this skip has been performed, it will position the space between the grid ends in alignment with the cutters which will then operate through the lever 77 to sever one of the finished grids, it being understood that at each severing operation, two finished grids are in the machine and the one held by the gripper is the one that is cut and subsequently released by the gripper as the finished product.

Another important advantage of our machine is brought out at this point where it will be noted that the grid construction is supported at both ends, that is, where it comes out of the die and it is supported in the gripper so that when the grid is sheared off by the cutters.

Figures 13, 14, 15, 17, 18, 19:
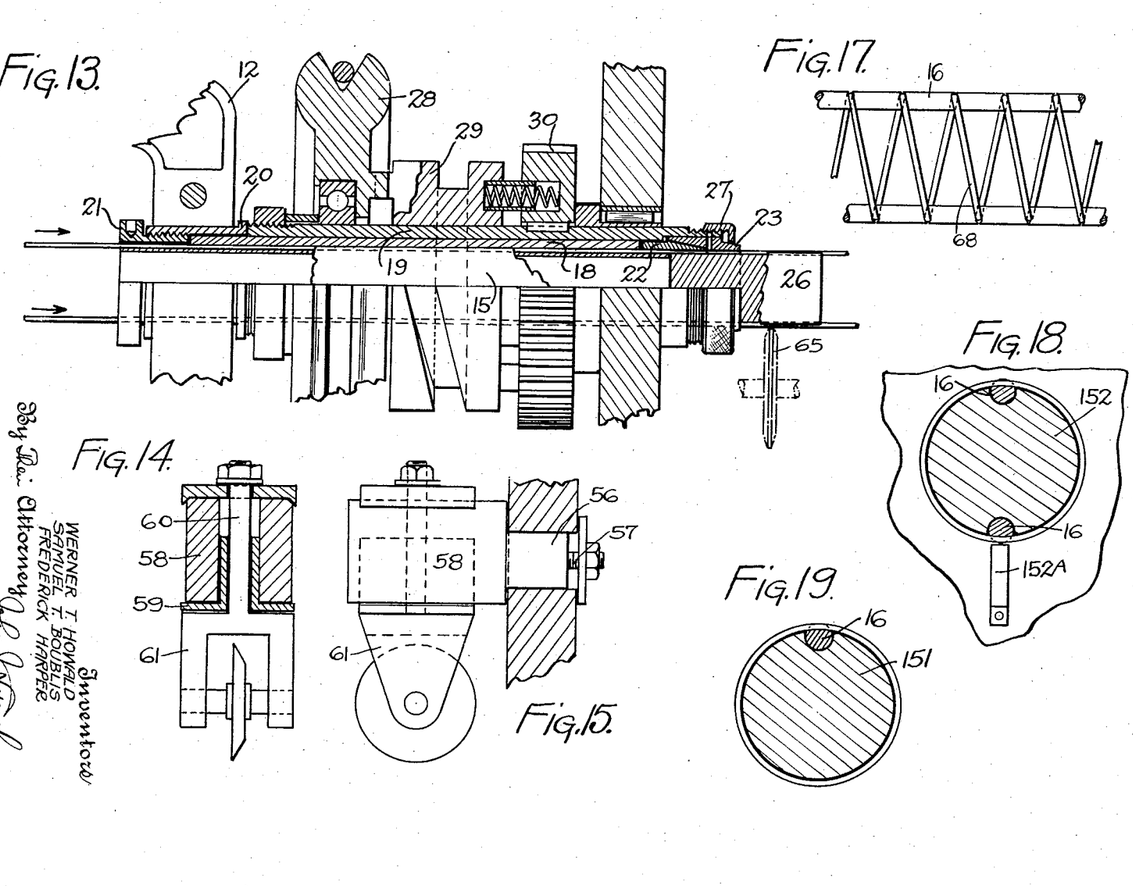
Figure 13 is a longitudinal section through the feeding mechanism.
Figure 14 is a view in section of a disk holding assembly.
Figure 15 is a section taken on the line 15—15 of Figure 14.
Figure 17 is a view in side elevation of a grid constructed in the machine.
Figure 18 is a view in cross section illustrating the cylindrical type of grid formed about the double wire support.
Figure 19 is a view similar to Figure 18 showing the use of a single wire as a support in the making of a cylindrical grid of the type illustrated in Figure 18.

Any type of grid may be wound and it is simply necessary to change the cross sectional shape of the die. In Figure 18, a cylindrical shaped die is illustrated as at 152 having suitable wire holding grooves in the opposite sides thereof, while in Figure 19, a cylindrical die is illustrated as at 151 having a single groove at one side thereof and the die may be of any diameter and as before mentioned, any shape.

Another important feature of our invention is the use of a small hammer piece 152—A which is secured to the base wall 9 and which is so arranged that it will just touch the support wire 16 each time the wire comes around to said hammer piece 152—A. It has been found in practice that the wire 16 coming out of the die holder will have a tendency to curl up even after it leaves the die with the result that the grids are slightly curved and we have found that the positioning of the piece 152—A, as illustrated, so that it gives a slight concussion to the wire 16 as it travels around, see Figure 18, will cause the grids to emerge perfectly straight from off the end of the die.

It is evident, therefore, that we have provided a machine which has many features of advantage and one in which grids may be produced rapidly and efficiently and at a saving in cost over the old type of manufacture.

It is also evident that a grid, the winding wire of which is seated in a groove in the supporting wire, the edges of the groove being thereafter swedged over to securely hold the wire in place, forms a unitary structure that will withstand jars and will have an increased life in its capacity in the tube.

We claim:

1. A grid winding machine comprising support wire revolving and pulling feed means, means for securing grid wire to the support wire as the grid wire is wound about the support wire by the revolving movement of the latter and means for additionally advancing the support wire by pulling at intervals to space the wound grids.

2. In a machine of the character described, means for feeding and revolving a grid structure constituting individual spaced grid windings including a gripper arranged to grip one of the finished windings, means for severing said finished winding, and means for automatically releasing said gripper.

3. In a machine of the character described, means for feeding a support wire, a chuck adapted to receive dies of varying cross sectional shapes and a die in the chuck over which the wire passes and over which a grid wire is wound to impart to the finished grid a desired cross sectional shape.

4. In a machine of the character described, means for feeding and revolving a grid structure constituting individual spaced windings including a gripper, a threaded shaft on the gripper, a nut through which the shaft passes, and means for revolving said shaft.

5. In a machine of the character described, a wire feeding means including a gripper, a shaft secured to the gripper, a nut having shaft engaging and releasing parts, means for reciprocating the nut, and means for operating said parts to engage or release the shaft at a predetermined time.

6. In a machine of the character described, a wire feeding means including a gripper, means for opening and closing the gripper at a predetermined time, a shaft secured to the gripper, a nut having shaft engaging and releasing parts, means for reciprocating the nut, and means for operating said parts to engage and release the shaft at a predetermined time.

7. In a machine of the character described, means for feeding and revolving a grid structure constituting individual spaced grid windings including a gripper, a shaft secured to the gripper, a nut having shaft engaging and releasing parts, means for reciprocating the nut, and means for operating said parts to engage and release the shaft at a predetermined time, means for severing one of the finished windings, and means for operating the gripper to release said severed winding.

8. In a machine of the character described, means for feeding and revolving a grid structure including a gripper, a threaded shaft on the gripper, a nut through which the shaft passes, and means for revolving said shaft.

9. In a machine of the character described, means for feeding and revolving a grid structure including a gripper, a threaded shaft on the gripper, a nut through which the shaft passes, means for revolving said shaft, and means for severing a finished winding.

10. In a machine of the character described, means for revolving and feeding a grid structure including a gripper, and means for automatically operating said gripper to engage and disengage the grid structure.

11. In a machine of the character described, means for revolving and feeding a grid structure including a gripper, means for advancing and retracting said gripper, and means for automatically operating said gripper to engage and disengage the grid structure.

12. In a machine of the character described, means for revolving and feeding a grid structure including a gripper, means for advancing and retracting said gripper, and means for automatically actuating the gripper to engage the grid structure at the end of an advance movement and disengage said structure at the end of a retractile movement.

13. A grid winding machine comprising support wire revolving and feeding means, means for securing grid wire to the support wire as the grid wire is wound about the support wire by the revolving movement of the latter and a hammer piece for engaging the support wire during its revolving movement to prevent subsequent distortion thereof.

14. In a machine of the character described, means for feeding and revolving a grid structure including a gripper, a threaded shaft on the gripper, a nut through which the shaft passes and means for revolving said shaft.

15. A grid winding machine comprising support wire revolving and pulling feed means, means for securing grid wire to the support wire as the grid wire is wound about the support wire by a revolving movement of the latter, means for additionally advancing the support wire by pulling at intervals to space the wound grid, and means for severing the support and grid wires in the space between the wound grids.

WERNER T. HOWALD. [L. S.]
SAMUEL T. BOUBLIS. [L. S.]
FREDERICK HARPER. [L. S.]